US012659061B2

(12) United States Patent
Lin et al.

(10) Patent No.: US 12,659,061 B2
(45) Date of Patent: Jun. 16, 2026

(54) EFFICIENT RADIO SWITCH FOR OPTIMIZING POWER CONSUMPTION IN LOW POWER SCENARIO

(71) Applicant: MEDIATEK INC., Hsin-Chu (TW)

(72) Inventors: Ying-You Lin, Hsinchu City (TW);
Jun-Wei Lin, Hsinchu City (TW);
Ren-Fang Gan, Hsinchu City (TW);
Ding-Yuh Hwang, Hsinchu City (TW);
Po-Ting Kao, Hsinchu City (TW);
Chia-Ning Chang, Hsinchu City (TW);
Ssu-Ying Hung, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 350 days.

(21) Appl. No.: 18/232,320

(22) Filed: Aug. 9, 2023

(65) Prior Publication Data

US 2024/0080117 A1     Mar. 7, 2024

Related U.S. Application Data

(60) Provisional application No. 63/403,307, filed on Sep. 2, 2022.

(51) Int. Cl.
*H04B 17/309* (2015.01)
*H04B 17/318* (2015.01)
*H04W 28/20* (2009.01)
*H04W 84/12* (2009.01)

(52) U.S. Cl.
CPC ......... *H04B 17/346* (2023.05); *H04B 17/318* (2015.01); *H04W 28/20* (2013.01); *H04W 84/12* (2013.01)

(58) Field of Classification Search
CPC ... H04B 17/318; H04B 17/346; H04W 28/20; H04W 84/12
See application file for complete search history.

(56) References Cited

U.S. PATENT DOCUMENTS

| | | | |
|---|---|---|---|
| 2009/0047946 A1 | 2/2009 | Sato | |
| 2011/0228749 A1 | 9/2011 | Taghavi Nasrabadi | |
| 2012/0309397 A1* | 12/2012 | Rao | H04W 36/302 |
| | | | 455/437 |
| 2016/0286438 A1 | 9/2016 | Weingertner | |
| 2019/0200415 A1* | 6/2019 | Erceg | H04L 12/2832 |
| 2021/0076396 A1* | 3/2021 | Chen | H04W 72/1268 |
| 2023/0209407 A1* | 6/2023 | Min | H04W 72/04 |
| | | | 370/329 |

* cited by examiner

*Primary Examiner* — Charles C Jiang
*Assistant Examiner* — Ryan C Kavleski
(74) *Attorney, Agent, or Firm* — Winston Hsu

(57) ABSTRACT

The present invention provides a wireless communication method of an electronic device, wherein the electronic device includes a first radio and a second radio, a maximum bandwidth or a maximum NSS supported by the first radio is different from a maximum bandwidth or a maximum NSS supported by the second radio. The wireless communication method includes the step of: using the first radio to communicate with another electronic device; determining if parameters of the electronic device satisfy a condition; and in response to the parameters of the electronic device satisfying the condition, enabling the second radio and using the second radio to communicate with the another electronic device, and disabling the first radio.

10 Claims, 4 Drawing Sheets

EFFICIENT RADIO SWITCH FOR OPTIMIZING POWER CONSUMPTION IN LOW POWER SCENARIO

CROSS REFERENCE TO RELATED APPLICATIONS

This application claims the benefit of U.S. Provisional Application No. 63/403,307, filed on Sep. 2, 2022. The content of the application is incorporated herein by reference.

BACKGROUND

In the daily use of a portable device with wireless network capabilities, most of the use cases usually require much less than the throughput supported by the portable device. Therefore, because the portable device always uses a radio frequency (RF) layer supporting high bandwidth and high throughput for daily usage with less Wi-Fi throughput requirements, it will cause unnecessary power consumption in the portable device.

SUMMARY

It is therefore an objective of the present invention to provide an electronic device having two radios, where the radio could include physical layer and RF circuits or include physical layer only or RF circuits only, the two radios correspond to different bandwidths or number of spatial streams (NSS), and the two radios can be switched to optimize the power consumption in the low power scenario, to solve the above-mentioned problems.

According to one embodiment of the present invention, a wireless communication method of an electronic device is disclosed, wherein the electronic device comprises a first radio and a second radio, a maximum bandwidth or a maximum number of spatial streams (NSS) supported by the first radio is different from a maximum bandwidth or a maximum NSS supported by the second radio. The wireless communication method comprises: using the first radio to communicate with another electronic device; determining if parameters of the electronic device satisfy a condition; and in response to the parameters of the electronic device satisfying the condition, enabling the second radio and using the second radio to communicate with the another electronic device, and disabling the first radio.

According to one embodiment of the present invention, a circuitry of an electronic device is disclosed, wherein the electronic device comprises a first radio and a second radio, a maximum bandwidth or a maximum NSS supported by the first radio is different from a maximum bandwidth or a maximum. NSS supported by the second radio, and the circuitry is configured to perform the steps of: using the first radio to communicate with another electronic device; determining if parameters of the electronic device satisfy a condition; and in response to the parameters of the electronic device satisfying the condition, enabling the second radio and using the second radio to communicate with the another electronic device, and disabling the first radio.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
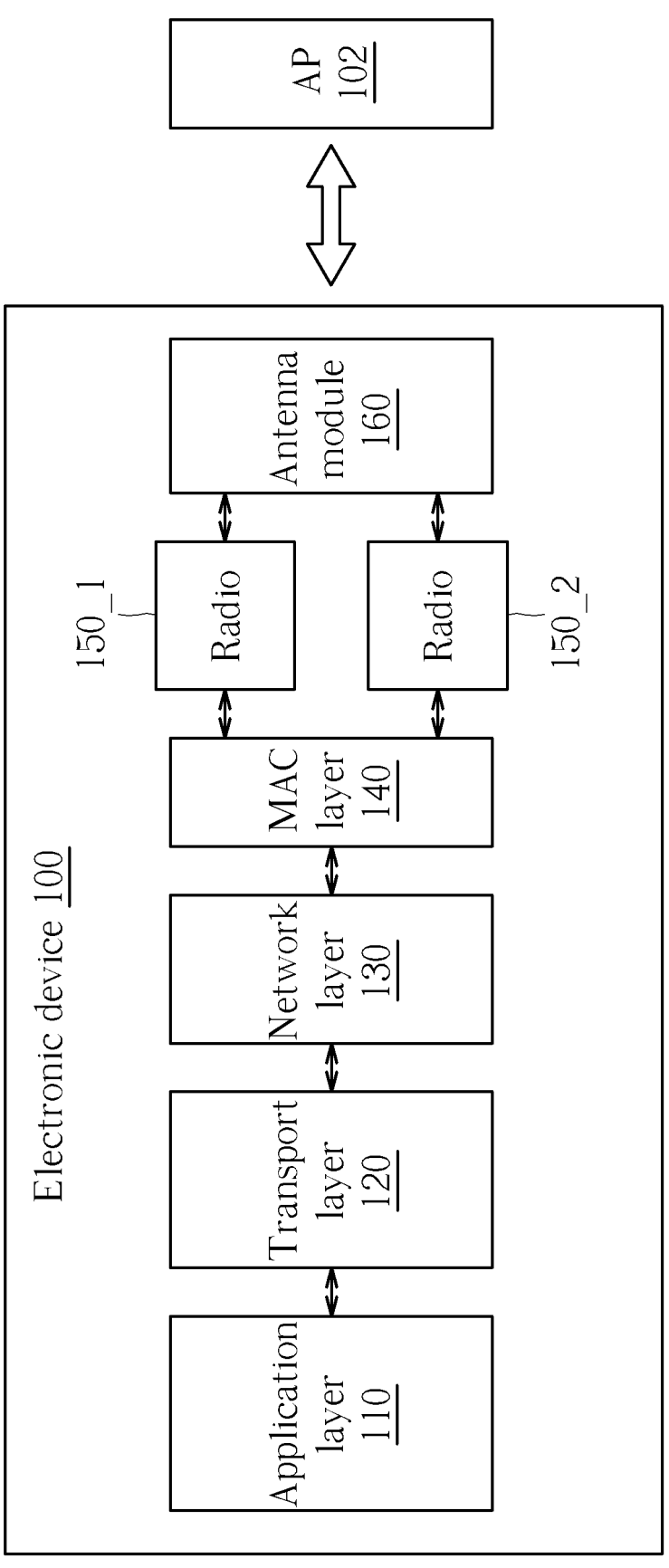
FIG. 1 is a diagram illustrating an electronic device according to one embodiment of the present invention.

FIG. 1 is a diagram illustrating an electronic device 100 according to one embodiment of the present invention. As shown in FIG. 1, the electronic device 100 comprises a circuitry comprising an application layer 110, a transport layer 120, a network layer 130, a media access control (MAC) layer 140, two radios 150_1 and 150_2 and an antenna module 160. In this embodiment, the electronic device 100 can be a notebook, a cell phone or any other electronic device capable of wirelessly communicate with other device(s) such as an access point 102. In this embodiment, the electronic device 100 may use a channel corresponding to a 2.4 GHz band (e.g., 2.412 GHz-2.484 GHz), a 5 GHz band (e.g., 4.915 GHz-5.825 GHz) or a 6 GHz band (e.g., 5.925 GHz-7.125 GHz) to communicate with the AP 102. In addition, each of the radios 150_1 and 150_2 comprises a physical layer and radio frequency (RF) circuits.

Each of the radios 150_1 and 150_2 can actively perform the data transmission and reception operation, that is each of the radios 150_1 and 150_2 can transmit data received from upper layers to the AP 102, and send packets received from the AP 102 to the upper layers. In addition, the antenna module 160 comprises a plurality of antennas, wherein a portion of the antennas are used by the radio 150_1 to communicate with the AP 102, and another portion of the antennas are used by the radio 150_2 to communicate with the AP 102.

In this embodiment, a maximum bandwidth or a maximum NSS supported by the radio 150_1 is different from that of the radio 150_2. Specifically, the radio 150_1 comprises a baseband circuit and a RF circuit, and the radio 150_1 supports higher bandwidth and/or higher NSS, for example, the bandwidth corresponding to the radio 150_1 may be 320 MHz, and the radio 150_1 may use two or more antennas to communicate with the AP 102 (e.g., 2*2 multi-in-multi-out (MIMO), NSS=2). In addition, the radio 150_2 also comprises a baseband circuit and a RF circuit, and the radio 150_2 supports lower bandwidth and/or lower NSS, for example, the bandwidth corresponding to the radio 150_2 may be 160 MHz, and the radio 150_2 may use only one antenna to communicate with the AP 102 (i.e., NSS=1). In another embodiment, the radio 150_1 and the radio 150_2 may share the same baseband circuit, but their RF circuits are different. In addition, because the radio 150_2 supports lower bandwidth and/or lower NSS, the power consumption of the radio 150_2 will be lower than that of the radio 150_1.

Because the electronic device 100 comprises the radios 150_1 and 150_2 corresponding to different bandwidth/NSS and power consumption, the electronic device 100 can refer to its applications or throughput to select one of the radios 150_1 and 150_2 for wireless communicating with the AP 102, to optimize the power consumption.

Figure 2:
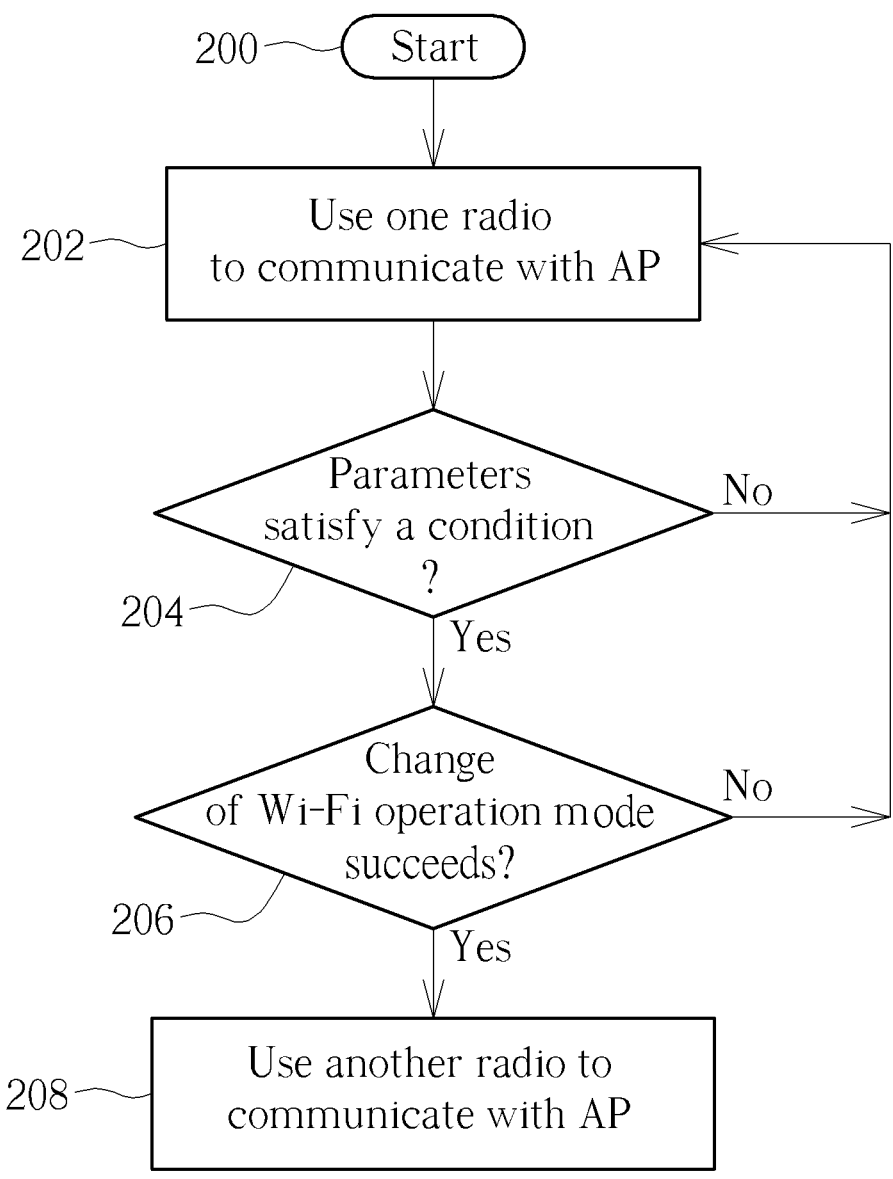
FIG. 2 is a flowchart of a wireless communication method of the electronic device according to one embodiment of the present invention.

FIG. 2 is a flowchart of a wireless communication method of the electronic device 100 according to one embodiment of the present invention. In Step 200, the flow starts, and the electronic device 100 has powered on and established one or more links with the AP 102. In Step 202, one radio such as 150_1 is selected for the communication with the AP 102, and the other radio such as 150_2 is powered off or in a power-saving mode. In Step 204, a circuitry within the MAC layer 140 or other layers determines if parameters of the electronic device 100 satisfy a condition, if yes, the flow enters Step 206; and if not, the flow goes back to Step 202 or stays at Step 204. In this embodiment, the parameters of the electronic device 100 may comprise application inputs such as Wi-Fi display (WFD) and virtual reality traffic that require high throughput, or gaming traffic that requires low throughput; and the parameters of the electronic device 100 may further comprise transmission control protocol (TCP) throughput, user datagram protocol (UDP) throughput, received signal strength indicator (RSSI), a signal-to-noise ratio (SNR), a packet error rate (PER), a position and moving distance, and/or Doppler indicator. In one embodiment, if the application of the electronic device 100 requires higher throughput, or the electronic device 100 has worse signal quality, the radio 150_1 is preferred to be used for the wireless communication; and if the application of the electronic device 100 requires lower throughput, and the electronic device 100 has better signal quality, the radio 150_2 is preferred to be used for power saving. Specifically, assuming that the radio 150_1 is selected in Step 202, if the circuitry detects that the TCP or UDP throughput is lower than a threshold such as 35 Mb/s, the RSSI/SNR is greater than a threshold, a PER is lower than a threshold, and/or the electronic device 100 is not moving, the circuitry determines that the parameters satisfy the condition. On the other hand, assuming that the radio 150_2 is selected in Step 202, if the circuitry detects that the TCP or UDP throughput is lower than a threshold such as 35 Mb/s, the RSSI/SNR is lower than a threshold, a PER is greater than a threshold, and/or the electronic device 100 is moving, the circuitry determines that the parameters satisfy the condition.

In Step 206, the circuitry determines that the currently unused radio is more suitable for the current operation, so the currently used radio such as 150_1 changes a Wi-Fi operation mode and uses the changed Wi-Fi operation mode to communicate with the AP 102, to determine if the changed Wi-Fi operation mode succeeds, if yes, the flow enters Step 208; and if not, the flow goes back to Step 202. In this embodiment, the currently used radio 150_1 handshakes with the AP 120 by using the changed Wi-Fi operation mode to determine if a bandwidth/NSS corresponding to the radio 150_2 can be successfully used. It is noted that the operation of changing the Wi-Fi operation mode is known by a person skilled in the art, so further descriptions about the Wi-Fi operation mode are omitted here.

In Step 208, the circuitry selects the other radio such has 150_2 for the following communication with the AP 102, and the radio 150_1 is powered off or in the power-saving mode. It is noted that, in the radio switching step, the settings of the MAC layer 140 are not changed, and the radio 150_2 uses the same channel with the same MAC address as the previously used radio 150_1 for active data transmission and data reception.

Figure 3:
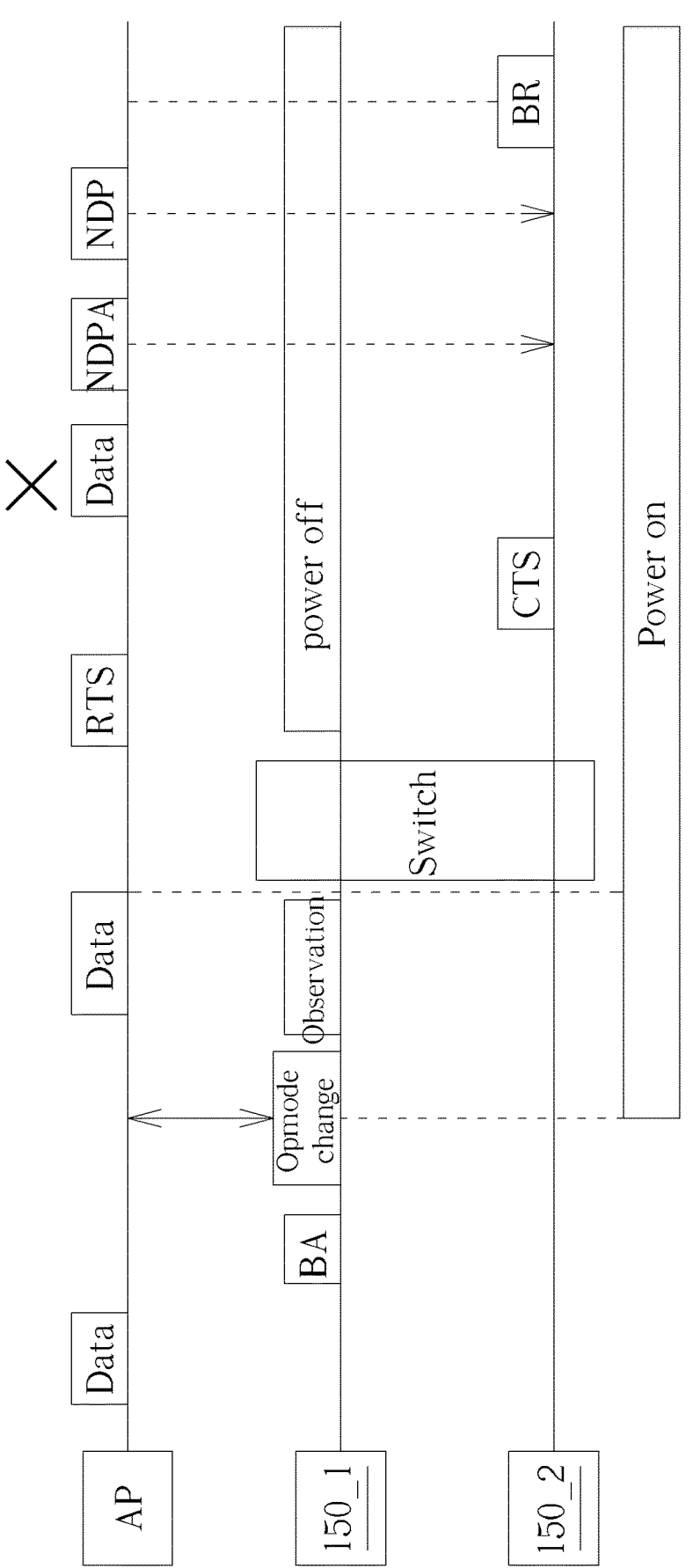
FIG. 3 is a timing diagram of the operations of the electronic device according to one embodiment of the present invention.

FIG. 3 is a timing diagram of the operations of the electronic device 100 according to one embodiment of the present invention. Referring to FIG. 1-FIG. 3 together, initially the electronic device 100 uses the radio 150_1 to communicate with the AP 102, and the AP 102 sends data to the radio 150_1, and the radio 150_1 responds a block acknowledgement (BA) to the AP 102. Then, if it is detected that the parameters of the electronic device 100 satisfy the condition, for example, the throughput is lower than a threshold or a signal quality is great, the Wi-Fi operation mode is changed, and the radio 150_1 observes the data from the AP 102 to determine if the change of the Wi-Fi operation mode succeeds. At this time, the radio 150_2 can be powered on to avoid switch gap latency. Then, assuming that the change of the Wi-Fi operation mode succeeds, the radio 150_2 is immediately selected for the following operation, and the radio 150_1 is powered off.

Then, the AP 102 sends a request-to-send (RTS) signal to the electronic device 100, and the radio 150_2 responds a clear-to-send (CTS) signal. After receiving the CTS signal, the AP 102 starts to transmit data to the electronic device 100. At this time, because the beamforming information stored in the AP 102 is for the previously used radio 150_1, the radio 150_2 may fail to receive this data. Therefore, the AP 102 performs Wi-Fi sounding to sequentially send a null data packet announcement (NDPA) and null data packets (NDP) to the electronic device 100, for the radio 150_2 to generate a beamforming report (BR) comprising states/information of baseband, RF and currently used channel to the AP 102, for the following wireless communication.

Figure 4:
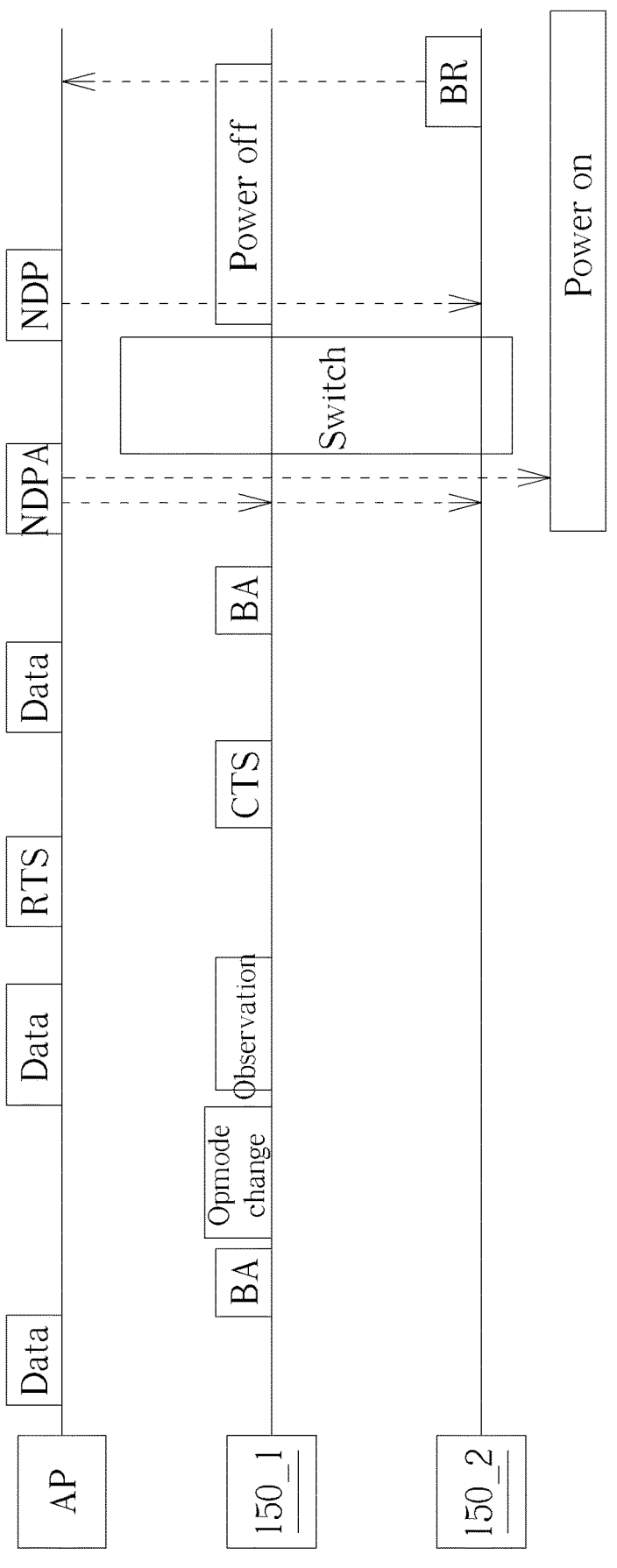
FIG. 4 is a timing diagram of the operations of the electronic device according to another embodiment of the present invention.

FIG. 4 is a timing diagram of the operations of the electronic device 100 according to another embodiment of the present invention. Referring to FIG. 1, FIG. 2 and FIG. 4 together, initially the electronic device 100 uses the radio 150_1 to communicate with the AP 102, and the AP 102 sends data to the radio 150_1, and the radio 150_1 responds a block acknowledgement (BA) to the AP 102. Then, if it is detected that the parameters of the electronic device 100 satisfy the condition, for example, the throughput is lower than a threshold or a signal quality is great, the Wi-Fi operation mode is changed, and the radio 150_1 observes the data from the AP 102 to determine if the change of the Wi-Fi operation mode succeeds. Then, assuming that the change of the Wi-Fi operation mode succeeds, the radio 150_1 uses the changed Wi-Fi operation mode to communicate with the AP 102, wherein the original Wi-Fi operation mode may correspond to higher bandwidth such as 320 MHz and/or higher NSS (e.g., NSS=2), and the changed Wi-Fi operation mode may correspond to lower bandwidth such as 160 MHz and/or lower NSS (e.g., NSS=1) that are the same as the bandwidth/NSS supported by the radio 150_2.

Generally, the AP 102 periodically performs Wi-Fi sounding to get the beamforming report from the electronic device 100. In this case, because the beamforming information stored within AP 120 still corresponds to the radio 150_1 now, the circuitry does not immediately switch the radios, that is the radio 150_1 is still used to communicate with the AP 102 until the next Wi-Fi sounding. Therefore, referring to FIG. 4, after the change of the Wi-Fi operation mode succeeds, the electronic device 100 still uses the radio 150_1 to receive the RTS signal and the data, and transmit the CTS signal and BA to the AP 102.

Then, because the AP 102 periodically performs Wi-Fi sounding, the electronic device 100 can estimate the Wi-Fi sounding time to power on the radio 150_2 at an appropriate time. For example, the radio 150_2 may be powered on before or after the Wi-Fi sounding.

Then, when the AP 102 starts to perform the Wi-Fi sounding, initially the AP 102 sends the NDPA to the electronic device 100. In this embodiment, there are two methods for the radio 150_2 to receive the NDPA, wherein a first method is that the radio 150_2 directly receive the NDPA from the AP 102, and a second method is that the radio 150_1 receives the NDPA from the AP 102, and passes the NDPA to the radio 150_2 via an internal channel. After receiving the NDPA, the circuitry within the electronic device 100 switches the radios so that the radio 150_2 is selected for the following operation, and the radio 150_1 is powered off or in the power-saving mode. Then, the AP 102 sends the NDP to the electronic device 100, for the radio 150_2 to generate a beamforming report comprising states/information of baseband, RF and currently used channel to the AP 102, for the following wireless communication.

In the embodiment shown in FIG. 4, because the radio 150_1 is still used after the change of the Wi-Fi operation mode and before the next Wi-Fi sounding, and the radio 150_2 is used only after the Wi-Fi sounding, the electronic device 100 is less likely to fail to receive packets from the AP 102, and the packet error rate can be decreased.

In the above embodiments, the electronic device 100 has only two radios 150_1 and 150_2, however, this feature is not a limitation of the present invention. In other embodiments, the electronic device 100 may have a first radio, a second ratio and a third radio, wherein the first radio supports higher bandwidth and/or higher NSS, the second radio supports middle bandwidth and/or middle NSS, and the third radio supports lower bandwidth and/or lower NSS. In addition, the first radio can be used when the electronic device 100 has higher throughput or lower signal quality, the second radio can be used when the electronic device 100 has middle throughput or middle signal quality, and the third radio can be used when the electronic device 100 has lower throughput or high signal quality. These alternative designs shall fall within the scope of the present invention.

Briefly summarized, in the wireless communication method of the present invention, by setting two radios with different bandwidths and/or different NSS, the radio with higher bandwidth and/or higher NSS can be used when the electronic device has higher throughput or lower signal quality, and the radio with lower bandwidth and/or lower NSS can be used when the electronic device has lower throughput or high signal quality. Therefore, the power consumption of the electronic device can be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of an electronic device, wherein the electronic device comprises a first radio and a second radio, each of the first radio and the second radio comprises a physical layer and radio frequency (RF) circuits or comprises the physical layer only or the RF circuits only, a maximum bandwidth or a maximum number of spatial streams (NSS) supported by the first radio is different from a maximum bandwidth or a maximum NSS supported by the second radio, and the wireless communication method comprises:

using the first radio to communicate with another electronic device;

determining if parameters of the electronic device satisfy a condition; and in response to the parameters of the electronic device satisfying the condition, enabling the second radio and using the second radio to communicate with the another electronic device, and disabling the first radio;

wherein the step of in response to the parameters of the electronic device satisfying the condition, enabling the second radio and using the second radio to communicate with the another electronic device comprises:

in response to the parameters of the electronic device satisfying the condition, changing a Wi-Fi operation mode and determining if the changed Wi-Fi operation mode succeeds for handshaking with the another electronic device;

if the changed Wi-Fi operation mode succeeds for handshaking with the another electronic device, still using the first radio to communicate with the another electronic device until the another electronic device performs a Wi-Fi sounding operation with the electronic device, and enabling the second radio and using the second radio to communicate with the another electronic device;

if the changed Wi-Fi operation mode does not succeed, still using the first radio to communicate with the another electronic device.

2. The wireless communication method of claim 1, wherein the step of using the first radio to communicate with the another electronic device comprises:

using the first radio with a media access control (MAC) address to communicate with the another electronic device via a channel; and the step of enabling the second radio and using the second radio to communicate with the another electronic device comprises:

using the second radio with the same MAC address to communicate with the another electronic device via the same channel.

3. The wireless communication method of claim 1, wherein the parameters comprise at least a portion of an application of the electronic device, a throughput of the electronic device, a received signal strength indicator (RSSI), a signal-to-noise ratio (SNR), a packet error rate (PER), a position and moving distance of the electronic device and a Doppler indicator.

4. The wireless communication method of claim 1, wherein the maximum bandwidth or the maximum NSS supported by the first radio is greater than the maximum bandwidth or the maximum NSS supported by the second radio, and the step of using the first radio to communicate with the another electronic device comprises:

using the first radio with a first bandwidth and a first NSS to communicate with the another electronic device; and the step of in response to the parameters of the electronic device satisfying the condition, changing the Wi-Fi operation mode and determining if the changed Wi-Fi operation mode succeeds for handshaking with the another electronic device comprises:

changing the Wi-Fi operation mode to have a second bandwidth and a second NSS, and determine if the changed Wi-Fi operation mode succeeds for handshaking with the another electronic device, wherein the second bandwidth is smaller than the first bandwidth, or the second NSS is less than the first NSS; and the step of if the changed Wi-Fi operation mode succeeds for handshaking with the another electronic device, enabling the second radio and using the second radio to communicate with the another electronic device comprises:

enabling the second radio and using the second radio with the second bandwidth and the second NSS to communicate with the another electronic device.

5. The wireless communication method of claim 1, wherein the step of if the changed Wi-Fi operation mode succeeds for handshaking with the another electronic device, enabling the second radio and using the second radio to communicate with the another electronic device further comprises:

when the another electronic device performs the Wi-Fi sounding operation, enabling the second radio to respond a beamforming report to the another electronic device; and using the second radio to communicate with the another electronic device.

6. A circuitry of an electronic device, wherein the electronic device comprises a first radio and a second radio, each of the first radio and the second radio comprises a physical layer and radio frequency (RF) circuits or comprises the physical layer only or the RF circuits only, a maximum bandwidth or a maximum number of spatial streams (NSS) supported by the first radio is different from a maximum bandwidth or a maximum NSS supported by the second radio, and the circuitry is configured to perform the steps of:

using the first radio to communicate with another electronic device;

determining if parameters of the electronic device satisfy a condition; and in response to the parameters of the electronic device satisfying the condition, enabling the second radio and using the second radio to communicate with the another electronic device, and disabling the first radio;

wherein the step of in response to the parameters of the electronic device satisfying the condition, enabling the second radio and using the second radio to communicate with the another electronic device comprises:

in response to the parameters of the electronic device satisfying the condition, changing a Wi-Fi operation mode and determining if the changed Wi-Fi operation mode succeeds for handshaking with the another electronic device;

if the changed Wi-Fi operation mode succeeds for handshaking with the another electronic device, still using the first radio to communicate with the another electronic device until the another electronic device performs a Wi-Fi sounding operation with the electronic device, and enabling the second radio and using the second radio to communicate with the another electronic device.

7. The circuitry of claim 6, wherein the step of using the first radio to communicate with the another electronic device comprises:

using the first radio with a media access control (MAC) address to communicate with the another electronic device via a channel; and the step of enabling the second radio and using the second radio to communicate with the another electronic device comprises:

using the second radio with the same MAC address to communicate with the another electronic device via the same channel.

8. The circuitry of claim 6, wherein the parameters comprise at least a portion of an application of the electronic device, a throughput of the electronic device, a received signal strength indicator (RSSI), a signal-to-noise ratio (SNR), a packet error rate (PER), a position and moving distance of the electronic device and a Doppler indicator.

9. The circuitry of claim 6, wherein the maximum bandwidth or the maximum NSS supported by the first radio is greater than the maximum bandwidth or the maximum NSS supported by the second radio, and the step of using the first radio to communicate with the another electronic device comprises:

using the first radio with a first bandwidth and a first NSS to communicate with the another electronic device; and the step of in response to the parameters of the electronic device satisfying the condition, changing the Wi-Fi operation mode and determining if the changed Wi-Fi operation mode succeeds for handshaking with the another electronic device comprises:

changing the Wi-Fi operation mode to have a second bandwidth and a second NSS, and determine if the changed Wi-Fi operation mode succeeds for handshaking with the another electronic device, wherein the second bandwidth is smaller than the first bandwidth, or the second NSS is less than the first NSS; and the step of if the changed Wi-Fi operation mode succeeds for handshaking with the another electronic device, enabling the second radio and using the second radio to communicate with the another electronic device comprises:

enabling the second radio and using the second radio with the second bandwidth and the second NSS to communicate with the another electronic device.

10. The circuitry of claim 6, wherein the step of if the changed Wi-Fi operation mode succeeds for handshaking with the another electronic device, enabling the second radio and using the second radio to communicate with the another electronic device further comprises:

when the another electronic device performs the Wi-Fi sounding operation, enabling the second radio to respond a beamforming report to the another electronic device; and using the second radio to communicate with the another electronic device.

* * * * *